United States Patent
Haug et al.

(10) Patent No.: US 9,217,504 B2
(45) Date of Patent: Dec. 22, 2015

(54) SHIFT CONTROL METHOD FOR AN AUTOMATED TRANSMISSION

(71) Applicant: ZF Friedrichshafen AG, Friedrichshafen (DE)

(72) Inventors: Marcus Haug, Friedrichshafen (DE); Benjamin Berger, Markdorf (DE); Florian Schneider, Lindenberg im Allgau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/534,231

(22) Filed: Nov. 6, 2014

(65) Prior Publication Data
US 2015/0152960 A1    Jun. 4, 2015

(30) Foreign Application Priority Data
Dec. 4, 2013   (DE) .......................... 10 2013 224 853

(51) Int. Cl.
F16H 61/04    (2006.01)

(52) U.S. Cl.
CPC ...... F16H 61/0403 (2013.01); *F16H 2061/047* (2013.01); *F16H 2061/0422* (2013.01); *Y10T 477/6425* (2015.01)

(58) Field of Classification Search
CPC .................. F16H 2061/047; F16H 61/0403
See application file for complete search history.

(56) References Cited

U.S. PATENT DOCUMENTS

| 2,400,540 | A | * | 5/1946 | Chilton | F16D 67/00 475/52 |
| 6,769,523 | B2 | | 8/2004 | Muetzel et al. | |
| 8,070,652 | B2 | | 12/2011 | Doebele et al. | |
| 9,103,439 | B2 | * | 8/2015 | Schneider | F16H 61/68 |
| 2008/0109143 | A1 | * | 5/2008 | Bartels | F16H 61/0403 701/67 |
| 2013/0047760 | A1 | * | 2/2013 | Ohmori | F16H 61/0437 74/331 |

FOREIGN PATENT DOCUMENTS

| DE | 10 2006 046 605 A1 | 4/2008 |
| DE | 10 2008 054 635 A1 | 6/2010 |
| DE | 10 2011 087 376 A1 | 6/2013 |

* cited by examiner

*Primary Examiner* — Tisha Lewis
(74) *Attorney, Agent, or Firm* — Davis & Bujold, P.L.L.C.; Michael J. Bujold

(57) ABSTRACT

A shift control method for an automated transmission of a motor vehicle. The transmission has an input shaft that is connectable, via a separator clutch, to an engine driveshaft. An output shaft is connected with the axle transmission of a drive axle or with a transfer box, and starting gears are engagable by gear clutches. When tooth-on-tooth positions occurs at the associated gear clutch, during engagement of a starting gear while the vehicle is stationary, such tooth-on-tooth positioning is resolved with maximum comfort. The method provides that when a tooth-on-tooth position exists at the gear clutch of the starting gear, engagement of the gear clutch is first interrupted, then drive torque is applied to the input shaft or a transmission shaft in driving connection therewith to rotate the input-side clutch half of the gear clutch, and the drive torque is then eliminated before the engagement of the gear clutch continues.

15 Claims, 1 Drawing Sheet

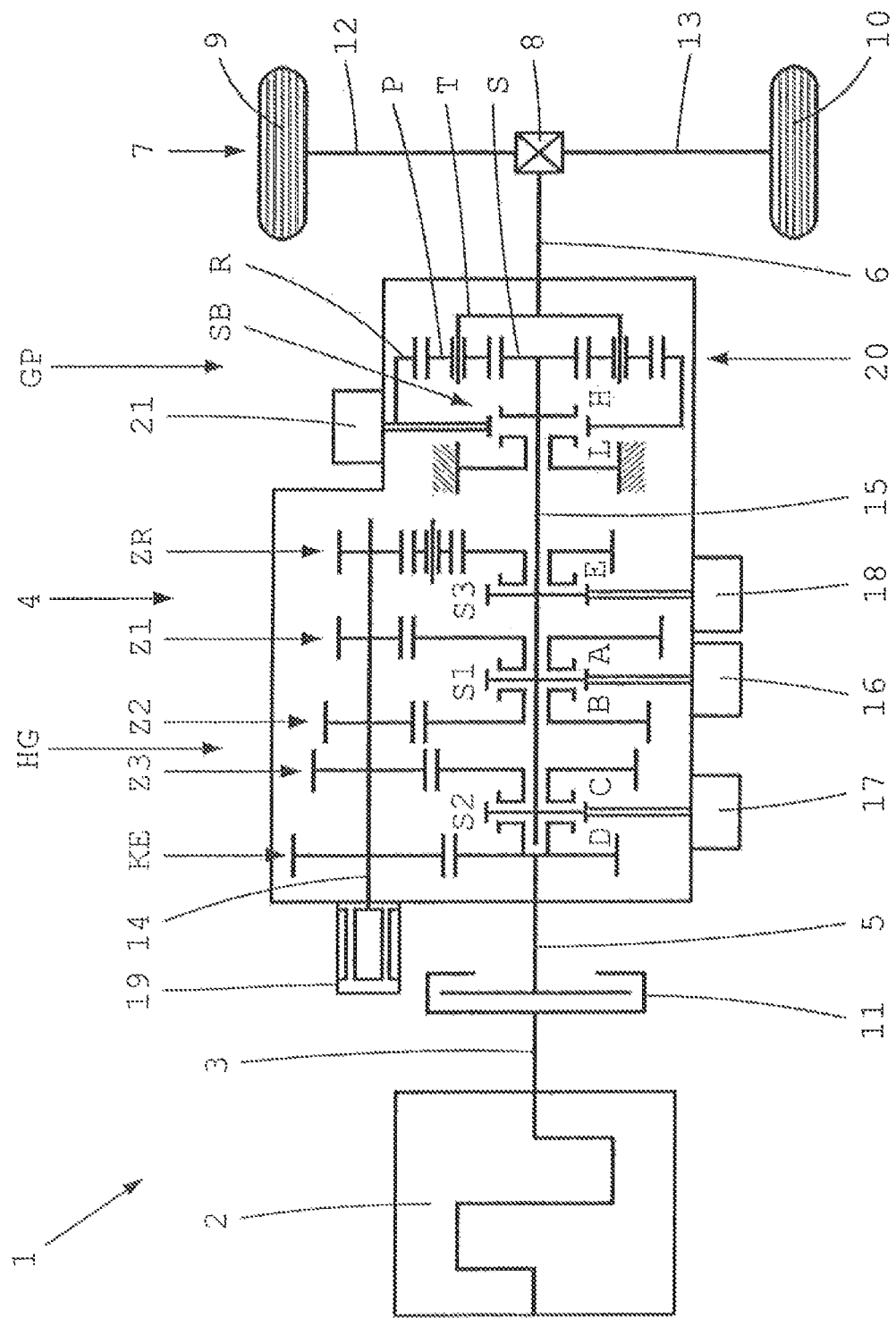

SHIFT CONTROL METHOD FOR AN AUTOMATED TRANSMISSION

This application claims priority from German patent application serial no. 10 2013 224 853.9 filed Dec. 4, 2013.

FIELD OF THE INVENTION

The invention concerns a shift control method for an automated transmission in a motor vehicle, whose input shaft can be connected by means of a separator clutch in the form of an automated friction clutch to the driveshaft of a drive engine, whose output shaft is in driving connection with the axle transmission of a drive axle or with a transfer box, and whose starting gears can be engaged by means of gear clutches in the form of unsynchronized claw clutches, wherein a tooth-on-tooth position that occurs at the associated gear clutch during the engagement of a starting gear while the vehicle is at rest, is resolved in the most comfortable way possible.

BACKGROUND OF THE INVENTION

The invention also concerns a shift control method in an automated transmission of a motor vehicle, whose input shaft can be connected by means of a separator clutch in the form of an automated friction clutch to the driveshaft of a drive engine, whose output shaft is in driving connection with the axle transmission of a drive axle or with a transfer box, and whose starting gears can be engaged by means of gear clutches in the form of unsynchronized claw clutches, wherein a tooth-on-tooth position during a correction shift from an engaged first starting gear to a second starting gear that is to be engaged, which position occurs at the associated gear clutch when the second starting gear is being engaged while the vehicle is at rest, is resolved as comfortably as possible.

Automated transmissions, particularly those used in commercial vehicles, are often equipped with gear clutches in the form of unsynchronized claw clutches. Compared with friction-synchronized gear clutches provided with blocking teeth, namely so-termed friction-synchronized gear clutches, unsynchronized claw clutches have an essentially more simple and more compact structure and are substantially more robust in driving operation. Thus, transmissions equipped with unsynchronized claw clutches can, on the one hand, be produced less expensively, and, on the other hand, have a longer service life than transmissions provided with friction-synchronized gear clutches.

In order to be able to engage unsynchronized claw clutches, the respective halves of the clutch, usually consisting of a clutch ring gear with outer teeth and a shifting sleeve with inner teeth, have to be brought to approximately the same rotational speed. The clutch ring gear is arranged laterally either on a loose wheel of a spur gear stage or on a hollow shaft section of a transmission component such as a sun gear, a planetary carrier or a ring gear of a planetary gearset. The shifting sleeve is arranged rotationally fixed but able to move axially on that transmission shaft on which the loose wheel of the spur gear stage concerned or the hollow shaft section of the planetary gearset concerned, is mounted to rotate.

When a claw clutch is engaged, however, which takes place by a corresponding axial displacement of the shifting sleeve, a so-termed tooth-on-tooth position can occur in which the front sides of the teeth of the shifting sleeve butt up or come in contact against the front sides of the teeth of the clutch ring gear, whereby the meshing of the shifting sleeve teeth in the tooth gaps of the clutch ring gear, and hence the engagement of the gear clutch concerned is prevented or at least delayed. In a gearshift during driving, a tooth-on-tooth position occurs relatively seldom because the two halves of the clutch, by virtue of their respective driving connections to the input shaft or the output shaft, are usually being driven at different rotational speeds. In contrast, since when the vehicle is at rest the input and output shafts are not moving, when a starting gear is being engaged a tooth-on-tooth position occurs more often. This is particularly the case when, with the vehicle at rest, a correction shift from an engaged first starting gear to a second starting gear to be engaged is carried out, since when a tooth-on-tooth position exists at the gear clutch of the first starting gear a tooth-on-tooth position at the gear clutch of the second starting gear is all the more probable because of the different transmission ratios of the starting gears. Such a correction shift is needed, for example, when a first starting gear has already been engaged in a commercial vehicle for driving up a loading ramp, and then, as a result of loading or unloading, the vehicle mass changes so substantially that the engaged starting gear is no longer suitable for the forthcoming starting process. Consequently, the transmission ratio of a second starting gear can be higher or lower than the transmission ratio of a first starting gear.

To resolve a tooth-on-tooth position at a claw clutch, rotation of the input-side clutch half relative to the output-side clutch half is required. For this, it is generally known to briefly act upon the input shaft in driving connection with the input-side clutch half with a drive torque or a braking torque. As is known, this can be done by partially closing the separator clutch, or by engaging an auxiliary motor that is in driving connection with the input shaft, or by engaging a transmission brake that is in driving connection with the input shaft.

U.S. Pat. No. 6,769,523 B2 describes a method for resolving a tooth-on-tooth position produced by a gearshift at a gear clutch in the form of a claw clutch, in accordance with which the starting and shifting clutch is closed farther in steps until the gear clutch concerned is engaged, or until a discontinuation criterion is fulfilled.

In contrast, in a method known from DE 10 2006 046 605 A1 it is provided that at every gearshift the starting and shifting clutch is partially closed and the drive torque imposed thereby on the input shaft is compensated by a transmission brake in driving connection with the input shaft. When a shift-related tooth-on-tooth position at a claw clutch occurs, the input shaft is then accelerated or slowed down by varying the braking torque of the transmission brake.

From DE 10 2008 054 635 A1 a method is known, in which a shift-related tooth-on-tooth position at a claw clutch is resolved by virtue of an electric machine in driving connection with the input shaft, by rotating the input-side half of the clutch through a defined rotational angle.

Finally, DE 10 2011 087 376 A1 describes a transmission control device for an automated transmission, which is designed such that a shift-related tooth-on-tooth position at a claw clutch is resolved either rapidly but with little comfort, or slowly but more comfortably, depending on at least one operating condition.

In the known method the gear clutch concerned is often engaged after the tooth-on-tooth position has been resolved while the input-side half of the clutch is still rotating, and therefore under the action of the drive torque that is producing the rotation of the input-side clutch half. This results in an abrupt drop of the drive torque, which is expressed as comfort-reducing shift jerk and a sudden loading of the drive-train as a whole. The shift jerk is particularly perceptible when the vehicle is at rest, i.e. when a starting gear is engaged or during a correction shift from an engaged first starting gear to a second starting gear that is to be engaged, and it then also gives rise to a starting jerk that has to be cushioned by timely engagement of the parking brake or by actuating the service brake of the vehicle.

SUMMARY OF THE INVENTION

Accordingly, the purpose of the present invention is to propose a shift control method for an automated transmission having the structure mentioned at the beginning, with which, while the vehicle is at rest during the engagement of a starting gear and during a correction shift from an engaged first starting gear to a second starting gear that is to be engaged, a tooth-on-tooth position that occurs at the associated gear clutch when the second starting gear is being engaged can be resolved as comfortably as possible.

The objective concerning the engagement of a starting gear is achieved, in combination with the characteristics described below, in that if a tooth-on-tooth position has occurred at the gear clutch of the starting gear, the engagement of the associated gear clutch is first discontinued and then, in order to rotate the input-side half of that gear clutch a drive torque is applied to the input shaft or to a transmission shaft in driving connection with it, and the drive torque is eliminated before the engagement of the gear clutch is continued.

Advantageous features and further developments of the method according to the invention are described below.

The method according to the invention begins with an automated transmission of a vehicle, whose input shaft can be connected by way of a separator clutch in the form of an automated friction clutch to the driveshaft of a drive engine, whose output shaft is in driving connection with the axle transmission of a drive axle or with a transfer box, and whose starting gears can be engaged by means of gear clutches in the form of unsynchronized claw clutches.

In order to comfortably resolve a tooth-on-tooth position that occurs at the associated gear clutch during the engagement of a starting gear, or during a correction shift from an engaged first starting gear to a second starting gear that is to be engaged when the second starting gear is being engaged, it is provided that if a tooth-on-tooth position exists at the gear clutch concerned the engagement of the gear clutch is first interrupted, whereby the clutch halves of the associated gear clutch are relieved from the control force of the associated shift actuator, so that the input-side clutch half can be rotated relative to the output-side clutch half by a lower drive torque. This also prevents the input-side clutch half, once the friction torque acting between the two clutch halves has been overcome, from accelerated rotation and thereby overshooting the subsequent tooth-on-tooth gap position. In a largely load-free condition the input-side clutch half of the gear clutch is then rotated by applying a drive torque to the input shaft or to a transmission shaft in driving connection therewith. Before the engagement of the clutch is continued, the drive torque is eliminated again so that the gear clutch can be engaged largely free from load and therefore without the occurrence of a severe shift jerk.

The existence of a tooth-on-tooth position at the gear clutch of the starting gear concerned is recognized, for example, if when engagement of the gear clutch is attempted, the shift position of the associated shift actuator as detected by sensors, or that of a shift transmission element which corresponds to the engaged condition of the gear clutch, is not reached within a specified time.

The engagement of the gear clutch can be interrupted by switching off the associated shift actuator so that the control force of the shift actuator is reduced to zero, and the engagement of the gear clutch can be resumed by switching on the associated shift actuator again so that the control force of the shift actuator is increased again to its specified normal value. When the shift actuator is switched off, the clutch half in control connection therewith is no longer pressed against the other half of the clutch, so that the input-side clutch half can rotate relative to the output-side clutch half without any inhibiting friction torque. Depending on the specific structure of the shift actuator, however, during this procedure the build-up of the control force when the shift actuator is switched on again may be delayed.

To avoid that disadvantage, it can therefore be provided as an alternative that the engagement of the gear clutch is interrupted by lowering the control force of the associated shift actuator to below a specified normal value, and resuming the engagement of the gear clutch by increasing the control force of the associated shift actuator again to the specified normal value. Since with this procedure the two clutch halves are still pressed against one another with a small shift actuator control force, a small friction torque will still act between them and to rotate the input-side clutch half this must be overcome by a slightly higher drive torque. However, after the input-side clutch half has rotated, the control force of the shift actuator can be increased again more rapidly to the specified normal value in order to resume the engagement process.

To interrupt the engagement of the gear clutch the control force of the associated shift actuator is reduced, for example, to a value between 10% and 20% of the specified normal value.

When the drive engine is running, the drive torque that serves to rotate the input-side clutch half can be applied to the input shaft by partially closing the separator clutch, and the drive torque can be eliminated by reopening the separator clutch.

To be able to carry out the subsequent starting process more rapidly, however, in order to eliminate the drive torque it is preferable not to open the separator clutch completely but only as far as its touch-point. The touch-point of a friction clutch is the clutch position in which the friction linings are just in contact with one another and the friction clutch therefore just begins transmitting a torque. Thus, if the separator clutch is already at its touch-point, the starting process after the starting gear has been engaged can be carried out more rapidly since there is no need to bridge any clear space between the fully opened clutch position and the touch-point position.

As an alternative to control by means of the separator clutch, the drive torque that serves to rotate the input-side half of the clutch can also be applied to the input shaft or to a transmission shaft in driving connection therewith by switching on an auxiliary motor in driving connection with the shaft concerned, and the drive torque can then be eliminated by switching off the auxiliary motor. In the context of the invention it is self-evident that the auxiliary motor, which can for example be an electric motor or a hydraulically or pneumatically driven motor, must be coupled to the shaft concerned whenever necessary if the driving connection concerned is not permanently in place.

The method described provides the possibility of resolving in a particularly comfortable manner a tooth-on-tooth position that has occurred at the gear clutch concerned during the engagement of a starting gear when the vehicle is at rest. Since by its nature this process takes more time than a less comfortable but correspondingly more rapid resolution of a tooth-on-tooth position, the use of the method according to the invention is not appropriate in every starting situation. It is therefore provided that at least one operating parameter of the motor vehicle is detected by means of sensors and evaluated in relation to the existence of a starting situation with comfort as a priority, the method only being applied when such a maximum-comfort starting situation exists.

For this, it can be provided that the accelerator pedal position is detected by sensor means and taken to indicate the existence of a maximum-comfort starting situation when the current accelerator pedal position does not exceed a predetermined deflection limit. If the driver deflects the accelerator pedal beyond the limit and therefore moves it through a larger distance, it can be assumed that the driver wishes to start quickly and therefore that he wants or accepts a more rapid and less comfortable resolution of the tooth-on-tooth position.

The same applies to the rate with which the driver deflects the accelerator pedal. Thus, it is also appropriate for the accelerator pedal deflection rate to be detected by sensor means and taken as an indication for a maximum-comfort starting situation if the current deflection rate of the accelerator pedal does not exceed a predetermined limit value of the deflection gradient.

Furthermore, the actuation condition of the parking brake can be detected by sensor means and taken as an indication of the existence of a maximum-comfort starting situation when the parking brake is engaged. In other words, when the driver wishes to start off quickly and therefore wants a more rapid even if less comfortable resolution of the tooth-on-tooth position, he will most probably hold the motor vehicle at rest no longer with the parking brake but rather, with the service brake.

As a further criterion the load condition of the motor vehicle can be taken into account, since when the vehicle is heavily loaded and therefore weighs more, rapid closing of the drive-train for reasons of driving safety takes precedence over comfort aspects. It is therefore preferably provided that the load condition of the motor vehicle is detected by sensor means and taken as an indication of the existence of a maximum-comfort starting situation when the laden weight of the motor vehicle does not exceed a predetermined load limit.

BRIEF DESCRIPTION OF THE DRAWING

To clarify the invention further, the description of a drawing of an example embodiment follows. In this, the sole FIGURE shows a schematic view of a drive-train with an automated transmission, with which the method according to the invention can be used.

DETAILED DESCRIPTION OF THE PREFERRED EMBODIMENTS

The drive-train 1 of a motor vehicle illustrated schematically in the FIGURE comprises a drive engine 2 in the form of an internal combustion engine with a driveshaft 3, an automated transmission 4 with an input shaft 5 and an output shaft 6, and a drive axle 7 with an axle transmission 8 and two drive wheels 9, 10. The input shaft 5 of the transmission 4 can be connected to and disconnected from the driveshaft 3 of the drive engine 2 by means of an automated separator clutch 11 in the form of a friction clutch. The output shaft 6 of the transmission 4 is in driving connection with the axle transmission 8 of the drive axle 7 and, by way of associated driveshafts 12, 13, with the drive wheels 9, 10 of the drive axle 7.

The transmission 4 is, for example, designed as a group transmission and comprises a main transmission HG of countershaft structure and a range group GP of planetary structure.

The input shaft 5 of the transmission 4 is in driving connection with a countershaft 14 of the main transmission HG arranged with its axis parallel to the input shaft 5, by way of an input constant KE comprising two fixed wheels.

By way of four spur gear stages Z1, Z2, Z3, ZR, each comprising a fixed wheel and a loose wheel, the countershaft 14 can be brought selectively, with different transmission ratios, into driving connection with an intermediate shaft 15 which is arranged coaxially between the input shaft 5 and the output shaft 6 and forms the output shaft of the main transmission HG. In a spur gear stage ZR that acts as a reversing stage, an intermediate wheel is arranged between the fixed wheel concerned and the associated loose wheel in order to reverse the rotation direction. The fixed wheels of the spur gear stages Z1, Z2, Z3, ZR are in each case arranged in a rotationally fixed manner on the countershaft 14. The loose wheels of the spur gear stages Z1, ZA2, Z3, ZR are in each case fitted to rotate on the intermediate shaft 15 and, in order to engage the respective gears, can be connected rotationally fixed thereto by means of associated gear clutches A, B, C, E. A direct gear can be engaged by means of an additional gear clutch D, which is arranged between the input shaft 5 and the intermediate shaft 15.

In the present case the five gear clutches A to E are in the form of unsynchronized claw clutches. The four gear clutches A to D for forward driving are combined in pairs in dual shifting elements S1, S2, which can each be actuated, i.e. engaged and disengaged, by means of an associated shift actuator 16, 17 respectively. The gear clutch E of the reversing stage ZR forms a single shifting element S3 which can also be actuated by means of an associated shift actuator 18. For the synchronization of the five gear clutches A to E the countershaft 14 is in driving connection with an auxiliary motor 19, which in the example illustrated is an electric machine.

The range group comprises a simple planetary gearset 20 with a sun gear S, a planetary carrier T carrying a plurality of planetary gearwheels P, and a ring gear R. The sun gear S of the planetary gearset 20 is connected to the intermediate shaft 15 in a rotationally fixed manner. The planetary carrier T of the planetary gearset 20 is connected rotationally fixed to the output shaft 6. By means of an unsynchronized dual shifting element SB, the ring gear R of the planetary gearset 20 can be alternatively fixed to the housing or coupled rotationally fixed to the intermediate shaft 15. In the L shift position of this dual shifting element SB, in which the ring gear R is fixed to the housing, the range group GP has a high transmission ratio of the order of 2.5 to 5.0 for the slow-driving range. In the shift position H of the dual shifting element SB, in which the ring gear R is coupled rotationally fixed to the intermediate shaft 15 and to the sun gear S connected thereto, the planetary gearset 20 is internally locked so that the range group GP then has the transmission ratio 1.0 for the fast-driving range. The dual shifting element SB of the range group GP can be actuated by an associated shift actuator 21, i.e. switched between the two shift positions L and H.

If now, with the vehicle at rest, for a starting process about to take place, for example the second gear G2 is to be engaged, for which with the slow-driving range L engaged in the range group GP the second gear of the main group HG for forward driving has to be engaged, i.e. the gear clutch B of the second spur gear stage Z2 of the main group HG has to be engaged, then a tooth-on-tooth position can occur at the gear clutch B concerned.

According to the invention, such a tooth-on-tooth position can be resolved with maximum comfort by first interrupting the engagement of the gear clutch B, then, to rotate the input-side clutch half of the gear clutch B, by applying a drive torque to the input shaft 5 or to the countershaft 14 in driving connection therewith, and then eliminating the drive torque again before continuing the engagement of the gear clutch B.

To interrupt the engagement process of the gear clutch B the associated shift actuator 16 can be switched fully off or at least the control force produced by the shift actuator 16 can be substantially reduced, for example to a value between 10% and 20% of the specified normal value. In this way the clutch halves of the gear clutch B are shifted to a largely force-free condition so that the input-side clutch half can be rotated by a comparatively small drive torque relative to the output-side clutch half so that the tooth-on-tooth position is resolved.

In the present case the drive torque for resolving the tooth-on-tooth position at the gear clutch B can be applied, optionally, either to the input shaft 5 with the drive engine 2 running by partially closing the separator clutch 11, or to the countershaft 14 by switching on the auxiliary motor 19. After this has been done for a short time, either the separator clutch 11 is opened again or the auxiliary motor 19 is switched off before the engagement process of the gear clutch B is continued. During this the separator clutch 11 is preferably only opened until it reaches its touch-point, in order to be able to carry out the subsequent starting process quickly. To continue the engagement process of the gear clutch B, depending on how the interruption was controlled either the associated shift actuator 16 is switched on again or the control force produced by the shift actuator 16 is increased again to its normal value.

When a starting gear is already engaged, for example if the second gear G2 is already engaged (dual shifting element SB in the L shift position and gear clutch B engaged) and it is realized that, for example because the motor vehicle has meanwhile been loaded, the gear currently engaged is no longer appropriate as the starting gear, then a correction shift to the lower, first gear G1 (dual shifting element SB in shift position L, gear clutch A engaged) is necessary. For this correction shift the dual shifting element S1 must therefore be switched over by the shift actuator 16 from shift position B, in which the gear clutch B is engaged, to shift position A in which the axially opposite gear clutch A is engaged. Since in general the ratio of the transmissions of the two spur gear stages Z1, Z2 concerned will not correspond to a whole-number multiple of the tooth spacing of the clutch teeth of the gear clutches A, B, the probability that a tooth-on-tooth position will occur at the gear clutch A of the starting gear G1 to be engaged is relatively high.

However, this tooth-on-tooth position at the gear clutch A of the first starting gear G1 to be engaged is resolved exactly analogously to the process sequence described earlier for resolving the tooth-on-tooth position at the gear clutch B of the second starting gear G2.

The method according to the invention ensures that for the rotation of the input-side clutch half relative to the output-side clutch half of the gear clutch to be engaged, only a relatively small drive torque is needed, and that the gear clutch concerned is only engaged when the drive torque has already been eliminated. In this way uncomfortable shift jerks that would otherwise occur are avoided.

INDEXES

1 Drive-train
2 Drive engine, internal combustion engine
3 Driveshaft
4 Transmission
5 Input shaft
6 Output shaft
7 Drive axle
8 Axle transmission
9 Drive wheel
10 Drive wheel
11 Separator clutch, friction clutch
12 Driveshaft
13 Driveshaft
14 Countershaft
15 Intermediate shaft
16 Shift actuator
17 Shift actuator
18 Shift actuator
19 Auxiliary motor, electric machine
20 Planetary gearset
21 Shift actuator
A to E Gear clutches
G1 First gear, starting gear
G2 Second gear, starting gear
GP Range group
H Shifting clutch, shift position
HG Main transmission
KE Input constant
L Shifting clutch, shift position
P Planetary gearwheel
R Ring gear
S Sun gear
S1 Dual shifting element
S2 Dual shifting element
S3 Single shifting element
SB Dual shifting element
T Planetary carrier
Z1 Spur gear stage
Z2 Spur gear stage
Z3 Spur gear stage
ZR Spur gear stage, reversing stage

The invention claimed is:

1. A shift control method for an automated transmission (4) in a motor vehicle, the transmission having an input shaft (5) that is connectable, by a separator clutch (11) in the form of an automated friction clutch, to a driveshaft (3) of a drive engine (2), an output shaft (6) in driving connection with either an axle transmission (8) of a drive axle (7) or a transfer box, and starting gears (G1, G2) that are engagable by gear clutches (A, B) in a form of unsynchronized claw clutches, the transmission being controlled such that tooth-on-tooth positions that may occur at the associated gear clutch (B), during engagement of a starting gear (G2) while the motor vehicle is at rest, are resolved with maximum comfort, the method comprising:

interrupting the engagement of the gear clutch (B) of the starting gear (G1) when a tooth-on-tooth position exists at the gear clutch (B) of the starting gear (G1);

applying a drive torque to either the input shaft (5) or a transmission shaft (14), in driving connection therewith, so as to rotate an input-side clutch half of the gear clutch (B); and eliminating the drive torque before engagement of the gear clutch (B) continues.

2. A shift control method for an automated transmission (4) in a motor vehicle, the transmission having an input shaft (5) that is connectable, by a separator clutch (11) in a form of an automated friction clutch, to a driveshaft (3) of a drive engine (2), an output shaft (6) in driving connection with either an axle transmission (8) of a drive axle (7) or a transfer box, and starting gears (G1, G2) that are engagable by gear clutches (A, B) in a form of unsynchronized claw clutches, the transmission being controlled such that when the motor vehicle is at rest, tooth-on-tooth positions that may occur at the associated gear clutch (A) during a correction shift from an engaged first starting gear (G1) to a second starting gear (G2) that is to be engaged, are resolved with maximum comfort, the method comprising:

interrupting engagement of the gear clutch (A) of the second starting gear (G2) when a tooth-on-tooth position exists at the gear clutch of the second starting gear (G2);

applying a drive torque to either the input shaft (5) or a transmission shaft (14) so as to rotate an input-side clutch half of the gear clutch (A) in driving connection therewith; and eliminating the drive torque before the engagement of the gear clutch (A) continues.

3. The method according to claim 1, further comprising recognizing a presence of the tooth-on-tooth position at the gear clutch (A, B) when the gear clutch (A, B) is being engaged, when a sensor-determined shifting position of either an associated shift actuator (16) or a shift transmission element, that corresponds to an engaged condition of the gear clutch (A, B), is not reached within a specified time.

4. The method according to claim 1, further comprising interrupting the engagement of the gear clutch (A, B) by switching off an associated shift actuator (16), and continuing the engagement of the gear clutch (A, B) by subsequently switching on the associated shift actuator.

5. The method according to claim 1, further comprising interrupting the engagement of the gear clutch (A, B) by reducing a control force of an associated shift actuator (16) to below a specified normal value, and continuing the engagement of the gear clutch (A, B) by subsequently increasing the control force of the associated shift actuator (16) to the specified normal value.

6. The method according to claim 5, further comprising interrupting the engagement of the gear clutch (A, B) by reducing the control force of an associated shift actuator to between 10% and 20% of the specified normal value.

7. The method according to claim 1, further comprising applying the drive torque to the input shaft (5) of the transmission (4), when the drive engine is running, by partially engaging the separator clutch (11), and eliminating the drive torque by subsequently disengaging the separator clutch (11).

8. The method according to claim 7, further comprising only disengaging the separator clutch (11) as far as a touch-point so as to eliminate the drive torque.

9. The method according to claim 1, further comprising applying the drive torque to either the input shaft (5) or the transmission shaft (14) in driving connection therewith, by switching on an auxiliary motor (19) that is in driving connection with the shaft (5; 14) concerned, and eliminating the drive torque by switching off the auxiliary motor (19).

10. The method according to claim 1, further comprising determining at least one operating parameter of the motor vehicle by sensor means and evaluating the at least one operating parameter in relation to existence of a maximum-comfort starting situation, and only applying the method when the maximum-comfort starting situation exists.

11. The method according to claim 10, further comprising detecting the position of an accelerator pedal by sensor means and evaluating the position of the accelerator pedal as an indication of the existence of a maximum-comfort starting situation if a current accelerator pedal position does not exceed a predetermined deflection limit value.

12. The method according to claim 10, further comprising detecting a deflection rate of an accelerator pedal by sensor means and evaluating the deflection rate of the accelerator pedal as an indication for existence of the maximum-comfort starting situation if a current deflection rate of the accelerator pedal does not exceed a predetermined limit value of a deflection gradient.

13. The method according to claim 10, further comprising detecting the actuation condition of a parking brake by sensor means and evaluating an actuation condition of the parking brake as an indication for existence of the maximum-comfort starting situation if the parking brake is engaged.

14. The method according to claim 10, further comprising detecting the load condition of a motor vehicle brake by sensor means and evaluating the load condition of the motor vehicle brake as an indication of existence of the maximum-comfort starting situation if a load weight of the motor vehicle does not exceed a predetermined loading limit.

15. A method of controlling shifting of an automated transmission (4) in a motor vehicle, the transmission having an input shaft (5) that is connectable, via a separator clutch, to a driveshaft (3) of a drive engine (2), an output shaft (6) of the transmission being drivingly connected to a drive axle (7), the transmission having first and second starting gears that are engagable so as to transmit drive from the input shaft to the output shaft for starting the vehicle, the first starting gear being engagable by a first gear clutch and a second starting gear being engagable by a second gear clutch, the method comprising:

initiating the method when the vehicle is stationary;

detecting, via at least one sensor, operating parameters of the vehicle which indicate a driver's desire for starting the vehicle with a maximum comfort;

starting an engagement process of the first gear clutch by displacing input and output clutch halves of the first gear clutch with a shift actuator so as to mesh with one another;

recognizing a tooth-on-tooth position of the first gear clutch;

interrupting the engagement process of the first gear clutch by de-actuating the shift actuator to discontinue displacement of the input and the output clutch halves of the first gear clutch;

rotating the input clutch half of the first gear clutch by applying drive torque to the input shaft which is drivingly connected to the input clutch half of the first gear clutch;

discontinuing applying drive torque to the input shaft; and continuing the engagement process so as to engage the first gear clutch and the first starting gear.

* * * * *